United States Patent [19]

Wada

[11] Patent Number: 4,543,702

[45] Date of Patent: Oct. 1, 1985

[54] FULLY AUTOMATIC METHOD AND APPARATUS FOR ASSEMBLING STICK-TYPE COSMETICS

[75] Inventor: Katsuhiko Wada, Amagasaki, Japan

[73] Assignees: Satoh Seiki Co., Ltd.; Elsol Product Corp., both of Japan

[21] Appl. No.: 609,724

[22] Filed: May 14, 1984

[51] Int. Cl.$^4$ ................. B23P 11/00; B23P 21/00
[52] U.S. Cl. ................. 29/434; 29/527.1; 29/530; 29/559; 29/701; 29/710; 29/711; 29/791; 29/795; 29/822; 264/242; 414/226; 414/786; 901/7
[58] Field of Search ............ 29/434, 530, 527.1, 29/559, 701, 705, 706, 707, 710, 711, 712, 791, 795, 822; 264/242; 414/222, 226, 786; 901/7; 206/385

[56] References Cited

U.S. PATENT DOCUMENTS

| | | | |
|---|---|---|---|
| 2,855,632 | 10/1958 | Croce et al. | 264/242 X |
| 2,879,548 | 3/1959 | Croce et al. | 264/242 X |
| 3,315,344 | 4/1967 | Niclas | 29/527.1 X |
| 3,796,327 | 3/1974 | Meyer et al. | 414/222 |
| 4,369,872 | 1/1983 | Sticht | 901/7 |
| 4,437,232 | 3/1984 | Araki et al. | 29/706 X |

Primary Examiner—Howard N. Goldberg
Assistant Examiner—Ronald S. Wallace
Attorney, Agent, or Firm—Ostrolenk, Faber, Gerb & Soffen

[57] ABSTRACT

Assembly of stick-type cosmetics such as lipsticks is fully automatized by highly coordinated operation of a pair of robots each accompanied with sequential operational units arranged within the ambit of its operational terminal so that sticks and bottles are transferred upside down from unit to unit for application of sequential operations and combined with each other and further with caps to form complete stick-type cosmetics. Simple adjustment in numerical control of the robots and their operational terminals will span a wide variety of quality demands in the market, and will make the system well suited for small scale production with high lot number in which shifting of lots is highly frequent. There is no manual touching of the sticks during assemblage which enables high level of sanitization of the whole system.

6 Claims, 11 Drawing Figures

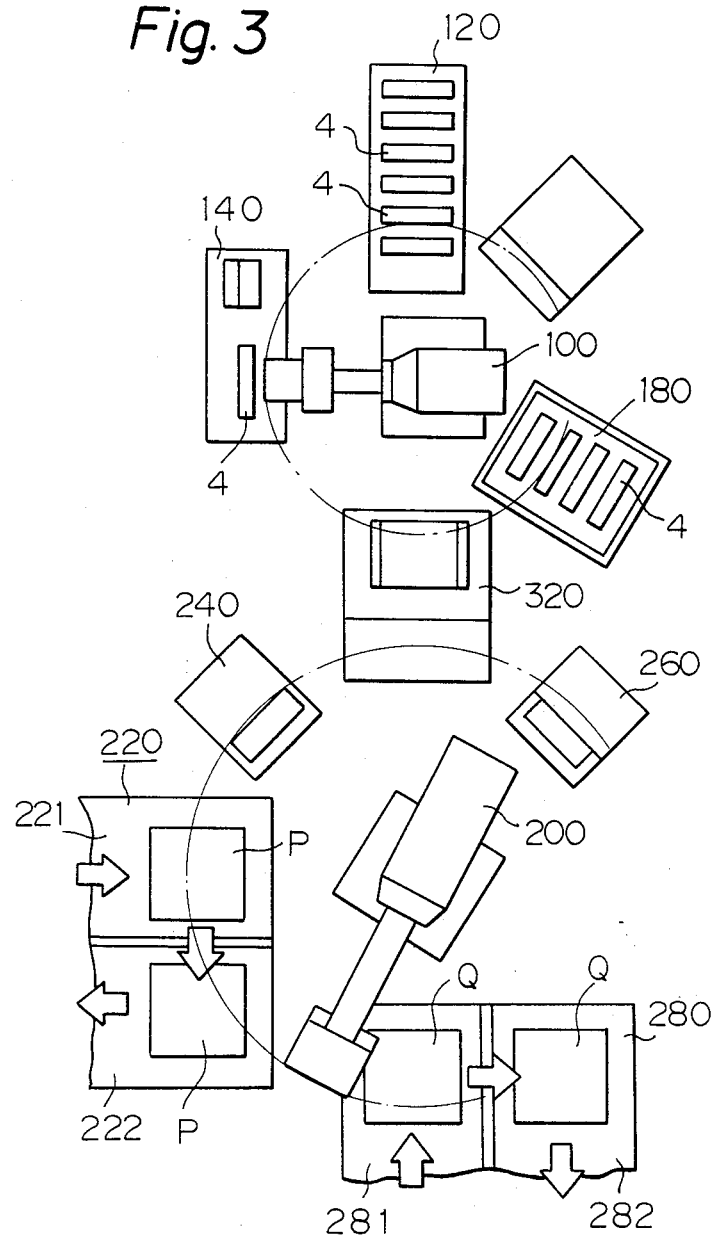

FULLY AUTOMATIC METHOD AND APPARATUS FOR ASSEMBLING STICK-TYPE COSMETICS

BACKGROUND OF THE INVENTION

The present invention relates to fully automatic method and apparatus for assembling stick-type cosmetics, and more particularly relates to a system which carries out assemblage of stick-type cosmetics such as lipsticks in a fully-automatic fashion.

Although the present invention is well applicable to all sorts of stick-type cosmetics, the following description is mainly focussed on application to lipsticks for conveniency purposes.

A lipstick is in general made up of a stick, a bottle and a cap which have to be assembled together for production. Assemblage of a lipstick is conventionally carried out by manual operations. In the manual production, colour-adjusted material paste is charged into stick holes of a split mould, sticks are taken out of the split mould after solidification by cooling, each stick is inserted into a bottle at the tail end, the stick is subjected to flaming in order to remove surface finger prints and/or crests formed by moulding and a cap is inserted over the bottle after withdrawal of the stick into the bottle.

Such a conventional manual assemblage requires a great deal of manual labour and redundant operations such as flaming. In addition, it is not preferable from a sanitarian point of view that, during production, operator's hand touches lipsticks which are brought into direct contact with user's lips at usage. Further, since the work is usually done by female operators in order to save labour cost, lipsticks are liable to be contaminated by powdery cosmetics and/or dandruff of the operators.

In order to avoid such troubles caused by manual handling in the assemblage, a rotary capsule type lipstick moulding machine has already been proposed. This moulding machine includes a great number of capsules which are arranged upright along the periphery of a round rotary table. Material paste is charged into the capsules during rotation of the table and, after solidification by cooling, lipsticks are discharged from the capsules by application of compressed air. No crests are developed on the surface of the lipsticks and moulding operation is automatized for effective reduction in manual labor. Continuous charge of the material paste appreciably streamlines the process.

Incidently, production of lipsticks faces a wide variety of quality demands. Point of sales of a lipstick is usually put on its configuration, in particular the shape of the tip. So, the production must be flexible enough to supply lipsticks of various configurations. The life cycle of a type of lipsticks is in general very short. Frequent change in type is caused by fashion factors, seasonal factors and geographical factors, and such change in type in most cases accompany corresponding change in stick configuration. Thus, production of lipsticks usually takes the form of a small scale production with high lot number. In other words, lipstick production is unsuited for any mass production system.

When appreciated from this point of view, the above-described automatic moulding machine needs to keep a wide variety of capsule groups, each group including a great number of capsules. A great deal of labour is needed for shifting from one lot to another lot while handling vast number of capsules. Separate control and separate storage of capsules also requires a great deal of attention and labour. For these reasons, the proposed automatic moulding machine is quite unsuited for the small scale production with high lot number which is unavoidably required for production of lipsticks.

SUMMARY OF THE INVENTION

It is the primary object of the present invention to provide a fully automatic system for assembling stick-type cosmetics which is well suited for small scale production with high lot number.

It is another object of the present invention to provide a fully automatic system for assembling stick-type cosmetics without any contamination and/or damage of sticks.

It is the other object of the present invention to provide a fully automatic system for assembling stick-type cosmetics with high process efficiency whilst minimizing machine idle time, semi-product stagnation and waste in operation.

The fully automatic assembling system in accordance with the present invention is based on use of a pair of NC robots which cooperate with each other in full coordination. This first robot is equipped with fingers for clamping moulds and movable in three-dimensional directions. The second robot is equipped with finger plates for clamping bottles and holding nozzles for holding bottles, both being movable in three-dimensional directions.

At operational stations taken around the first robot, are arranged a mould supply unit, a material charge unit, a cooling unit and, preferably, a defective mould unit, all within the operational ambit of the fingers of the first robot. At operational stations taken around the second robot, a bottle supply unit, a bottle draw-out unit, a stick draw-in unit and a capping unit, all within the operational ambits of the finger plates and the suction holders of the second robot. Further, a docking unit is arranged astride the operational ambits of the first and second robots.

The fingers of the first robot take out an empty mould from the mould supply unit or from the docking unit in order to supply same to the material charge unit for charge of the material paste. The fingers further take out a charged mould from the material charge unit and supply same to the cooling unit whereat the fingers take out a cooled mould in order to supply same to the docking unit. The cooled mould is first opened at the docking unit in order to expose the tails of solidified sticks out of the upper face of the mould.

The holding nozzles of the second robot take out prescribed number of bottles at once from the bottle supply unit and supply same to the bottle draw-out unit whereat the finger plates take out drawn-out unit whereat the finger plates take out drawn-out bottles in order to supply same to the docking unit. At the docking unit the bottles are combined with the sticks on the mould. Next, the stick-bottle combinations are taken out from the mould by operation of the holding nozzles for supply to the stick draw-in unit at which the finger plates take out drawn-in stick-bottle combinations for supply to the capping unit. At the capping unit, each stick-bottle combinations is combined with a cap standing by in a pallet to form a lipstick.

DESCRIPTION OF THE DRAWINGS

FIG. 3 is a plan view of the whole construction of one embodiment of the apparatus in accordance with the present invention.

DESCRIPTION OF THE PREFERRED EMBODIMENTS

Figures 1A, 1B:
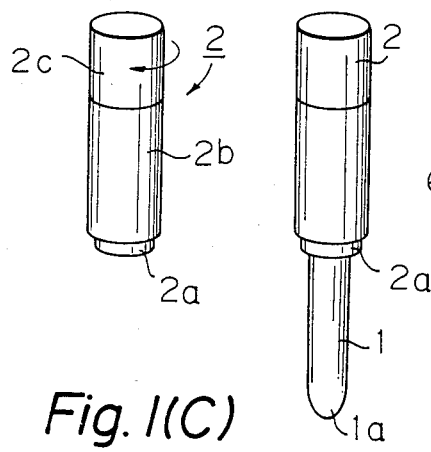
FIGS. 1A to 1C are perspective views for showing operational steps taken in assemblage of lipsticks.
Figure 1C:
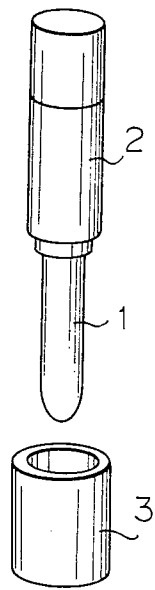

FIGS. 1A to 1C depict a part of the operational steps in assemblage of lipsticks to which the present invention is advantageously applied. As well known, a lipstick is made up of a stick 1, a bottle 2 and a cap 3. The bottle 2 includes a stick holder 2a into which the tail of the stick 1 is force inserted, a main case 2b for encasing the stick holder 2a with the stick 1 and a rotary body 2c which is connected to the tail of the stick holder 2a and extends on the rear side of the main case 2b. When the rotary body 2c is rotated while holding the main case 2b, a built-in spiral mechanism drives the stick holder 2a for projection from and withdrawl into the main case 2b. Projection of the stick holder 2a is referred to as "bottle draw-out" and withdrawl of the stick holder 2a is referred to as "stick draw-in". These operations are shown in FIG. 1A. Combination of a stick 1 with a drawn-out bottle 2 is referred to as "docking", which is shown in FIG. 1B. At docking, the tail of the stick 1 is force inserted into the stick holder 2a of the bottle 2.

After completion of the docking, a stick-bottle combination is subjected to stick draw-in and further to combination with a cap 3. This operation is referred to as "capping", which is shown in FIG. 1C.

Figure 2:
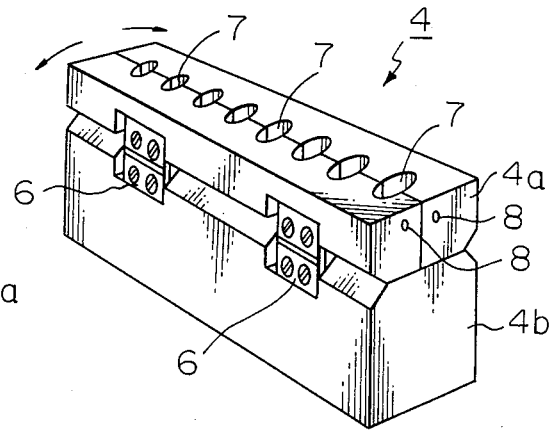
FIG. 2 is a perspective view of one example of the mould used for shaping of sticks.

An embodiment of a mould used for shaping of lipsticks is shown in FIG. 2, in which a metallic mould 4 is comprised of an upper splittable section 4a and a lower base section 4b. These sections 4a and 4b are connected to each other by side hinges 6. As shown with arrows in the illustration, the splittable section 4a can be opened sideways. An array of stick holes 7 are formed vertically in the mould 4 whilst opening in the top face of the mould 4. Although eight stick holes 7 are shown in the illustration, the number of the stick holes 7 in a mould is unlimited to this example. Each stick hole 7 is given in the form of a blind hole whose bottom corresponds in shape to the tip 1a of a stick 1 shown in FIG. 1B. The splittable section 4a is provided on its end faces with pairs of pin holes 8 for engagement with later described pins for opening of the splittable section 4a. After solidification by cooling of the material pasted charged in the stick holes, the spittable section 4a is opened sideways so that the tails of sticks 1 should be exposed out of the top face of the base section 4b.

The whole construction of one embodiment of the apparatus in accordance with the present invention is shown in FIG. 3, in which a number of operational units are arranged arround a pair of robots within their operational ambits.

The first robot 100 shown in the upper half of the illustration is involved in handling of moulds 4 for formation of sticks. At operational stations properly taken around the first robot 100 are arranged a mould supply unit 120, a material charge unit 140, a defective mould unit 160 and a cooling unit 180. The second robot 200 shown in the lower half of the illustration is involved in handling of bottles 2 including those combined with sticks 1. At operational stations properly taken around the second robot 200 are arranged a bottle supply unit 220, a bottle draw-out unit 240, a stick draw-in unit 260 and a capping unit 280. At an operational station astride the operational ambits of the two robots 100 and 200 is arranged a docking unit 320.

(I) Construction and Individual Operations of the First Robot 100

Figure 4:
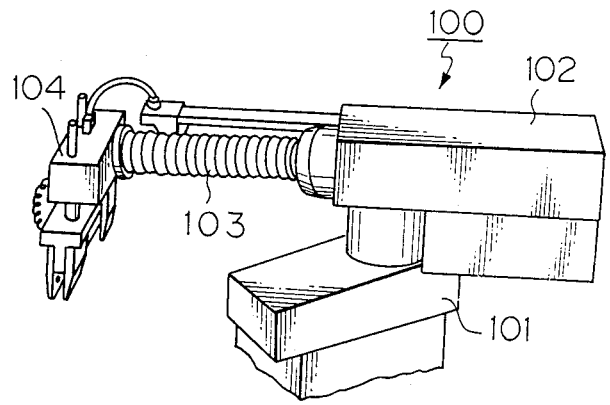
FIG. 4 is a perspective view of one embodiment of the first robot used for the apparatus shown in FIG. 3.

The whole construction of one embodiment of the first robot 100 is shown in FIG. 4, in which the robot 100 includes, as major components, a pedestal 101, a main body 102 mounted to the pedestal in a horizontally rotatable arrangement, an arm 103 extending forwards from the main body 102 and longitudinally extensible in a telescopic fashion, and a head 104 attached to the tip of the arm 103. As the main body 102 rotates on the pedestal 101, the head 104 at the arm tip travels from unit to unit as shown with a chain arc line in the illustration. As the arm 103 extends or shrinks, the head 104 moves towards or away from each unit. Rotation of the main body 102 and extension of the arm 103 are carried out by proper known mechanisms under numerical control by the robot 100.

Figure 5:
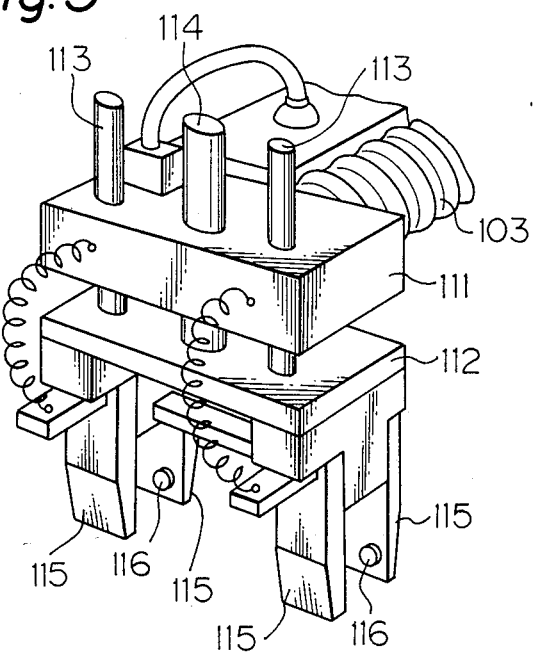
FIG. 5 is a perspective view of one embodiment of the head of the first robot shown in FIG. 4.

One embodiment of the head 104 of the first robot 100 is shown in FIG. 5, in which the head 104 includes a head main body 111 secured to the tip of the arm 103 and a finger holder 112 arranged below the head main body 111 in a vertically movable fashion. More specifically, a pair of guide posts 113 and a drive shaft 114 are secured to the top face of the finger holder 112 and extend upwards idly through the head main body 111. The drive shaft 114 is placed in engagement with a proper drive mechanism such as a pinion-rack mechanism built in the head main body 111 and driven thereby for longitudinal movement. Different types of driving mechanism may be used for the drive shaft 114. The finger holder 112 is provided with two pairs of fingers 115 projecting downwards and the fingers 115 in each pair are provided with resilient clamp pieces 116 attached on their mating faces. The fingers 115 in each pair are driven for movement towards and away from each other by a proper drive mechanism such as solenoids built in the finger holder 112. When the fingers 115 move towards each other, they clamp a mould such as shown in FIG. 2 via the clamp pieces 116. Whereas they release the mould 4 when they move away from each other.

As is clear from the foregoing, the fingers 115 forming the operational terminal of the first robot 100 travel from unit to unit on rotation of the main body 104 on the pedestal 101, move towards and away from each unit on extension and shrink of the arm 103, move upwards and downwards in relation to a mould 4 on placed a unit on vertical movement of the finger holder 112 with respect to the head main body 111, and clamp and release a mould on their mutual approach and separation.

(II) Construction and Individual Operations of the Second Robot 200

The whole construction of the second robot 200 is substantially same as that of the first robot 100 and its illustration is therefore omitted. On the second robot 200, a main body is mounted to a pedestal in a horizontally rotatable arrangement a telescopically extensible arm 203 projects forwards from the main body and a head 204 is coupled to the tip of the arm 203. As the main body rotates on the pedestal, the head 204 at the arm tip travels from unit to unit as shown with a chain arc line in FIG. 3 and moves towards and away from each unit as the arm 203 extends and shrinks. Rotation of the main body and extension of the arm 203 are carried out by known drive mechanisms under numerical control by the second robot 200.

Figure 6:
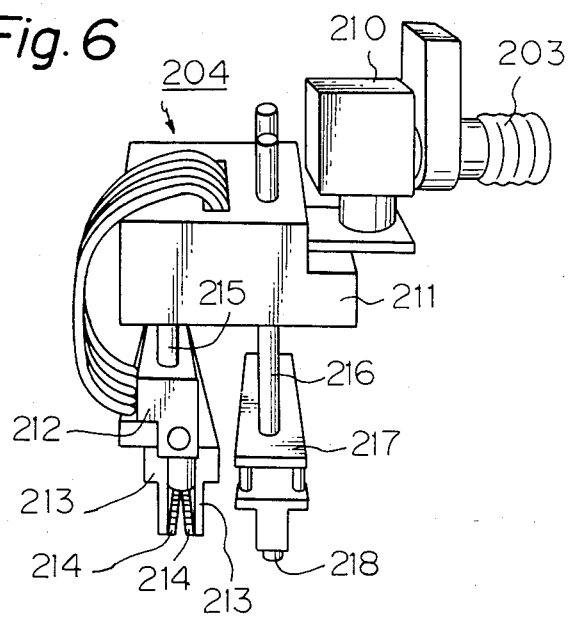
FIG. 6 is a perspective view of the head of the second robot used for the opperatus shown in FIG. 3.

One embodiment of the head 204 of the second robot 200 is shown in FIG. 6, in which the head 204 includes a main body holder 210 secured to the tip of the arm 203. A head main body 211 is mounted to the main body holder in a horizontally rotatable arrangement. A finger holder 212 is arranged below the fore section of the head main body 211 and vertically movable along guide posts 215 carried by the head main body 211. A pair of finger plates 213 are mounted to the finger holder 212 and provided, at the lower ends on the mating faces, with clamper teeth 214 adapted for clamping prescribed number of bottles 2 at once. The finger plates 213 are driven by a proper drive mechanism such as solenoids built in the finger holder 212 for movement towards and away from each other. That is the prescribed number of bottles 2 are clamped by the pair of clamper teeth 214 when the finger plates 213 move towards each other. Whereas, the bottles 2 are released from the clamp at once when the finger plates 213 move away from each other.

A nozzle holder 217 is arranged below the rear section of the head main body 211 substantially in parallel to the finger holder 212 and vertically movable along guide posts 216 carried by the head main body 211. Holding nozzles 218 are carried by the nozzle holder 217 and project downwards. The number of the holding nozzle 218 is equal to the number of bottles 2 clamped at once by the finger plate 213. The holder nozzles 218 are connected to a proper pneumatic suction source built in the nozzle holder 217. The holding nozzles 218 hold bottles 2 when the suction is turned on, and release sam when the suction is turned off. The vertical movements of the finger holder 112 and the nozzle holder 217 are operationally related to each other but may be caused by separate mechanisms.

As is clear from the foregoing, the finger plates 213 and the holding nozzles 218 forming the operational terminals of the second robot 100 travel from unit to unit on rotation of the main body on the pedestal, move towards and away from each unit on extension and shrink of the arm 203 and shift their positions in horizontal planes on rotation of the head main body 211 about the main body holder 210. This horizontal change in position may take place at a unit or during travel between units. The finger plates 213 move vertically towards and away from bottles placed on a unit on the vertical movement of the finger holder 212 with respect to the head main body 211. The finger plates 213 further clamp and release the bottles on their mutual approach and separation. The holding nozzles 218 move towards and away from bottles placed on a unit on the vertical movement of the nozzle holder 217 with respect to the head main body 211. The holding nozzles 218 further hold and release the bottles on turning on and off of the suction.

(III) Construction and Operation of the Mould Supply Unit 120

The mould supply unit 120 may be given in the form of a known belt or chain conveyer mechanism which bears thereon arrays of mould in an upright position. The circulation of the conveyor mechanism is timed to the operation of the first robot 100 so that the mould should be periodically supplied to the operational ambit of the fingers 115 of the first robot 100.

(IV) Construction and Operation of the Material Charge Unit 140

Figure 7:
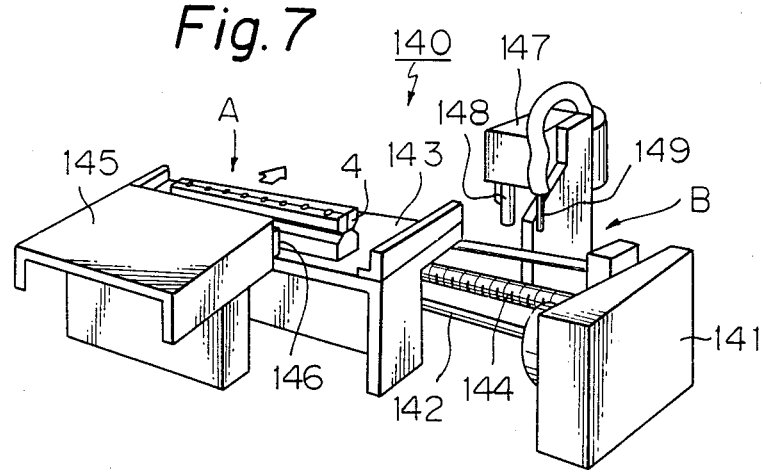
FIG. 7 is a perspective view of one embodiment of the material charge unit for the apparatus shown in FIG. 3.

One embodiment of the material charge unit 140 is shown in FIG. 7, in which an operation table 143 is idly inserted over horizontal guide bars 142 secured to a stand 141 in operational engagement with a drive shaft 144 driven for rotation by a proper drive motor build in the stand 141. On rotation of the drive shaft 144, the operation table 143 travels along the guide bars 142 between a transfer position A and a charging position B. At the transfer position A, is located a pusher magagine 145 in front of the operation table 143. As a pusher 146 encased in the pusher magagine advances, a mould 4 on the operation table 143 is pushed rearwards as shown with an arrow in the drawing. A material charger 147 arranged at the charging position B is provided with a demoulding agent nozzle 148 and a material paste nozzle 149.

A mould clamped by the fingers 115 of the first robot 100 is first placed and released onto the fore side section of the operation table 143. Next, the pusher 146 advances to push the mould 4 rearwards. Thereupon, the drive shaft 144 starts to rotate in one direction and the operation table 143 moves towards the charging position B along the guide bars 142. On arrival at the operational ambit of the material charger 147, the demoulding agent nozzle 148 first intrudes into the first stick hole 7 of the mould 4 for coating of the demoulding agent and the material paste nozzle 149 next charges the material paste in the first stick hole 7. As the material paste have been charged in all of the stick holes 7, the drive shaft 144 rotates in the reverse direction and the operation table 143 returns to the transfer position A. The fingers 115 of the first robot 100 them clamp the charged mould 4 in order to take it out from the material charge unit 140.

The foregoing explanation is directed to handling of a single mould 4. In practice, however, a number of moulds 4 are sequentially supplied to the material charge unit 140, sequentially charged with the material paste, and sequentially taken out from the material charge unit 140. In order to meet this sequential operation, the fingers 115 of the first robot 100 first supplies an empty mould 4 onto the fore section of the operation table 143, move upwards, rearwards and downwards in order to clamp and take out a charged mould 4 placed on the rear section of the operation table 143. Thereafter, the pusher 146 advances in order to push the empty mould 4 rearwards. This process is repeated by the fingers 115 and the pusher 146 on every arrival of the empty mould.

(V) Construction and Operation of the Defective Mould Unit 160

The defective mould unit 160 is used for excluding defective moulds 4 out of the system when separation of sticks 1 from a mould 4 cannot be carried out well at the docking unit 320. Since happening of this malfunction at the docking unit 320 is not so frequent, the defective mould unit 160 may be given in the form of a simple flat table receptive of defective moulds transferred from the docking unit 320 by operation of the fingers 115 of the first robot 100.

(VI) Construction and Operation of the Cooling Unit 180

The cooling unit 180 is used for solidification by cooling of the material paste charged in a mould 4 at the material charge unit 140, and, therefore, may be given in the form of a simple cooling bath or a simple cooling chamber. In the simplest case, moulds 4 are placed in a cool water contained in a cooling bath. A cooling chamber with circulating cooling air may be used with its top opening being shut by an air curtain. For effective cooling, it is preferable that several moulds should always stay together at the cooling unit 180. In this way, the cooling unit 180 may act as a sort of temporary reservoir of moulds 4 for coordination in the general operation of the whole system In the case of the illustrated embodiment, three moulds 4 always stay at the cooling unit 180. A charged mould 4 is supplied from the side of the unit close to the robot 100 and a cooled mould 4 is taken out from the side of the unit remote from the robot 100.

(VII) Construction and Operation of the Bottle Supply Unit 220

The bottle supply unit 220 includes pallet take-in and take-out channels 221 and 222 arranged side by side, each being provided with a proper belt or chain conveyer mechanism. Each pallet P contains arrays of bottles 2 positioned upside down. A pallet P with bottles 2 is supplied along the take-in channel 221. The holding nozzles 218 (see FIG. 6) of the second robot 200 take out one aray of bottles 2 at one time. After bottles 2 have been all taken out by repeated operation of the holding nozzles 218 of the second robot 200, the empty pallet P is passed to the take-out channel 222 by operation of a proper shifter mechanism (not shown) and discharged from the system along the take-out channel 222.

(VIII) Construction and Operation of the Bottle Draw-Out Unit 240

For combination of a stick 1 with a bottle 2, the stick holder 2a of the bottle 2 has to project out of the main case 2b as shown in FIG. 1A. However, on bottles 2 supplied by bottle makers, i.e. on bottles supplied from the bottle supply unit 220, the position of the stick holder 2a differs from bottle to bottle quite at random. So, for the sake of smooth combination, the position of the stick holders 2a has to be detected and, when a stick holder 2a of a bottle 2 is withdrawn, the stick holder 2a has to be completely drawn out of the main case 2b in advance to combination with a stick 1. This operation is carried out by the bottle draw-out unit 240.

Figure 8:
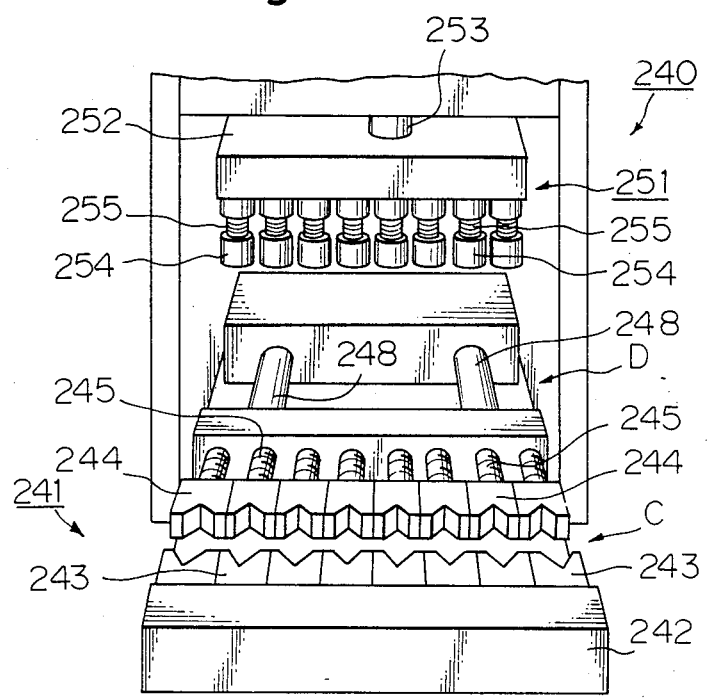
FIG. 8 is a perspective view of one embodiment of the bottle draw-out unit or the stick draw-in unit used for the apparatus shown in FIG. 3.

One embodiment of the bottle draw-out unit 240 is shown in FIG. 8, in which the bottle draw-out unit 240 includes, as major components, a bottle holding assembly 241 and a bottle rotating assembly 251.

The first holder 242 of the bottle holding assembly 241 carries a number of fixed holding teeth 243 arranged side by side in a horizontal direction. Facing the fixed holding teeth 243, same number of mobile holding teeth 244 are arranged side by side in a horizontal direction. Each mobile holding tooth 244 is operationally coupled to the second holder 246 by means of a drive shaft 245 in screw engagement with the bottom of the mobile holding tooth 244. Facing fixed holding tooth 243 and mobile holding tooth 244 have in their mating faces cutouts adapted for holding a bottle 2. As the drive shafts 245 are driven for rotation by a proper drive mechanism built in the second holder 246, the mobile holding teeth 244 move horizontally towards and away from the fixed holding teeth 243. Though omitted in the illustration, proper guides are arranged for smooth horizontal movement of the mobile holding teeth 244.

The first and second holders 242 and 246 are both idly inserted over guide bars 248 extending forwards from the third holder 247 on the rear side. The first and second holders 242 and 246 are driven, by a proper drive mechanism, for movement between a transfer position C taken on the fore side and a draw-out position D taken on the rear side.

The bottle rotating assembly 251 is provided with a rotor holder 252 which is operationally coupled to a proper drive mechanism (not shown) via a support shaft 253 for vertical movement at the draw-out position D. A number of rotors 254 are coupled to the rotor holder 252 via spring mechanisms 255 whilst projecting downwards. The number of the rotor 254 is equal to that of the fixed holding teeth 243 (or the mobile holding teeth 244). The rotors 254 are driven for rotation by a proper drive motor built in the rotor holder 252. The spring mechanisms 255 allow elastic pressure contact of the rotors 254 with bottles 2.

The bottle draw-out unit 240 is preferably provided with a proper detector such as a photoelectric sensor adapted for discrimination of bottle size. Operation of the bottle draw-out unit 240 should be started at different moments depending on the size of the bottle to be processed.

Before the operation is started, the bottle holding assembly 241 is located at the fore transfer position C and the mobile holding teeth 244 are located remote from the fixed holding teeth 243. Under this condition, the holding nozzles 218 of the second robot 200 supply the bottles 2 in an upside down position to the bottle draw-out unit 240 and locate the main cases 2b of the bottles 2 between the fixed and mobile holding teeth 243 and 244. Thereupon, the mobile holding teeth 243 is drived for movement towards the fixed holding teeth 243 by rotation of the drive shaft 245 in order to clamp the main cases 2b of the bottles 2 in between the fixed and mobile holding teeth 243 and 244.

While keeping this condition, the first and second holders 242 and 246 move rearwards towards the draw-out position D along the guide bars 248. Then, the rotor holder 252 moves downwards so that the rotors 254 should be brought into elastic pressure contact with the tails of the rotary bodies 2c of the bottles 2. Under this condition, the rotors 254 are driven for rotation so that the rotary bodies 2c should be rotated with respect to the main body 2b blocked against rotation due to the clamp by the fixed and mobile holding teeth 243 and 244. Thanks to this relative rotation, the stick holders 2a all project out of the main cases 2b of the bottles 2. Draw-out operation is thus completed.

Thereafter, the bottle rotating assembly 251 moves upwards, the first and second holders 242 and 246 move forwards towards the transfer position C and the finger plates 213 (see FIG. 6) of the second robot 200 clamp the tails of the bottles 2. Then, the mobile holding teeth 244 are driven for rearward movement by the reverse rotation of the drive shaft 245 in order to release the clamp on the bottles 2 which are then taken out in an upside down position from the bottle draw-out unit 240 by operation of the finger plates 213 of the second robot 200.

(IX) Construction and Operation of the Docking Unit 320

Figure 9:
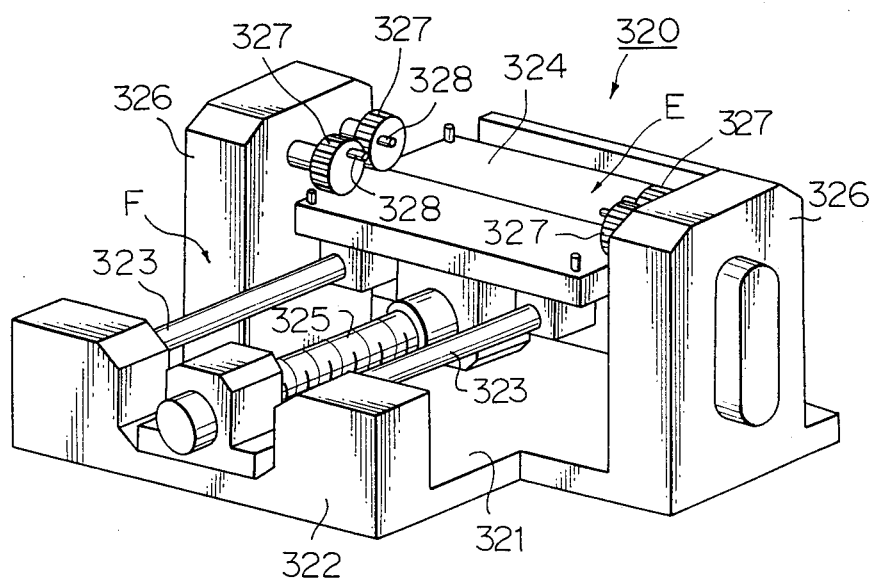
FIG. 9 is a perspective view of one embodiment of the docking unit used for the apparatus shown in FIG. 3.

One embodiment of the docking unit 320 is illustrated in FIG. 9, in which guide bars 323 are horizontally carried by a stand 322 secured on a pedestal 321 and an operation table 324 is idly inserted over the guide bars 323. The bottom section of the operation table 324 is in screw engagement with a drive shaft 325 which is driven for rotation by a proper drive motor built in the stand 322. As the drive shaft 245 rotates, the operation table 244 travels along the guide bars 232 between a transfer position E and a docking position F. At the transfer position, are a pair of stands 326 located on both sides of the operation table 324 and each stand 326 is provided with a pair of opener gears 327 arranged side by side in meshing engagement on its face close to the operation table 324. Each opener gear 327 is provided with an opener pin 328 projecting from its end facing the operation table 324. Further, the opener gears 327 are movable towards and away from the operation table 324 and one of the opener gears 327 is positively driven for rotation by a proper drive motor built in the stand 326.

Before the docking operation is started, the operation table 324 is located at the transfer position E as shown in the drawing. A cooled mould 4 taken from the cooling unit 180 by operation of the fingers 115 (see FIG. 5) of the first robot 100 is supplied to the docking unit 320 and placed on the operation table 324. Then, the operation table 324 moves towards the docking position F while being driven by rotation of the drive shaft 325 in order to bring the mould 4 to the position of the opener gears 327. Next, the opener gears 327 advance towards the mould 4 from both sides in order to insert their opener pins 328 into the pin holes 8 (see FIG. 2) in the end faces of the mould 4. Under this condition, eather of the opener gears 327 is driven to rotate outwards so that the other opener gear 327 should rotate oppositely outwards. As the opener pins 328 separate from each other due to such reverse rotations of the opener gears 327, the splittable section 4a of the mould 4 is opened sideways so that the tails of the solidified sticks 1 should project from the top face of the base section 4b of the mould 4.

Under this condition, the drive shaft 325 further rotates in order to bring the operation table 324 to the docking position F. Thereupon, the stick holders 2a of the bottles 2 clamped upside down by the finger plates 213 of the second robot 200 are force inserted over the tails of the sticks 1 projecting from the mould 4 by downward movement of the finger plates. Docking operation is now over.

By upward movement of the finger plates 213, the sticks 1 are separated from the mould and stick-bottle combinations in an upside down position are next taken out of the docking unit 320 by further movement of the finger plates 213.

(X) Construction and Operation of the Stick Draw-In Unit 260

In assemblage of a lipstick, the stick 1 has to be withdrawn into the bottle 2 in advance to the capping operation. To this end, the rotary body 2c is rotated in a direction opposite to that in the bottle draw-out operation while blocking the main case 2b against rotation. Therefore, the construction of the stick draw-in unit 260 is substantially same as that of the bottle draw-out unit 240 shown in FIG. 8, and its illustration is omitted.

Stating the operation roughly, the main cases 2b of the stick-bottle combinations supplied by the finger plates 213 of the second robots 200 are clamped in between fixed and mobile holding teeth, rotors are brought into pressure contact with tails of the rotary bodies 2c of the bottles 2, the sticks 1 are withdrawn into the bottles by rotation of the rotors, and the drawn-in bottles 2 are taken out of the docking unit 260 by operation of the holding nozzles 218 (see FIG. 6) of the second robot 200.

(XI) Construction and Operation of the Capping Unit 280

The construction of the capping unit 280 is substantially same as that of the bottle supply unit 220. That is, the capping unit 280 includes take-in and take-out channels 281 and 282 arranged side by side. The channels are equipped with proper belt or chain conveyer mechanisms circulating in opposite directions. For supply along the take-in channel 281, caps 3 are encased within a pallets with their open ends upside. The holding nozzles 218 of the second robot 200 insert the bottles 2 into the caps 3. When the pallet Q is full of capped bottles 2, the pallet Q is passed to the take-out channel 282 for discharge from the system by operation of a proper shifter mechanism not shown.

(XII) General Operation of the First Robot 100

One example of the general operation performed by the first robot 100 will now be explained in reference to FIG. 3. Moulds are indicated with two digit numbers, the first digit indicates that the object is a mould 4 and the second digit indicates the order of sequence of the mould. That is, the first mould is indicated with a reference numeral "41" whereas the third mould is indicated with a reference numeral "43".

First, the first robot 100 rotates to register its head 104 at the mould supply unit 120 and the fingers 115 takes out the first mould 41. Next, the first robot 100 rotates counterclockwise in FIG. 3 to register the head at the material charge unit 140 and the fingers 115 supplies the first empty mould 41. Material paste is charged in the first mould 41 at the material charge unit 140.

The robot 100 rotates clockwise to register the head 104 again at the mould supply unit 120 and the fingers 115 takes out the second empty mould 42. Next, the robot 100 rotates counterclockwise to register the head 104 again at the material charge unit 10, the fingers 115 supplies the second empty mould 42 and takes out the frist charged mould 41. Material paste is charged in the second mould 42 at the material charge unit 140.

Next, the robot 100 rotates counterclockwise to register the head 104 at the cooling unit 160 and the fingers 115 supply the first charged mould 41. which is then cooled at the cooling unit 180.

The robot 100 rotates clockwise to register the head 104 at the mould supply unit 120 and the fingers 115 take out the third empty mould 43. The robot 100 next rotates counterclockwise to register the head 104 at the material charge unit 140, the fingers 115 supply the third empty mould 43 and take out the second charged mould 42. Material paste is charged in the third mould 43 and at the material charge unit 140.

The robot 100 next rotates counterclockwise to register the head 104 and the cooling unit 180 and the fingers 115 supply the second charged mould 42, which is then cooled together with the first charged mould 41.

The robot 100 rotates clockwise to register the head 104 at the mould supply unit 120 and the fingers 115 take out the fourth empty mould 44. The robot 100 then rotates counterclockwise to register the head 104 to the material charge unit 140, the fingers 115 supply the fourth empty mould 44 and take out the third charged mould 43. Material paste is charged in the fourth mould 44 at the material charge unit 140. Next, the robot 100 rotates counterclockwise to register the head 104 at the cooling unit 180 and the fingers 115 supply the third charged mould 43 which is then cooled together with the first and second charged moulds 41 and 42.

The robot 100 again rotates clockwise to register the head 104 at the mould supply unit 120 and the fingers 115 take out the fifth empty mould 45. The robot 100 then rotates counterclockwise to register the head 104 at the material charge unit 140, the fingers 115 supply the fifth emply mould 45 and take out the fourth charged mould 44. Material paste is charged in the fifth mould 45 at the material charge unit 140.

The robot 100 next rotates counterclockwise to register the head 104 at the cooling unit 180, the fingers 115 supply the fourth charged mould 44 and take out the first cooled mould 41. The second to fourth charged moulds 42-44 are cooled together at the cooling unit 180.

The robot 100 now rotates clockwise to register the head at the docking unit 320 and the fingers 115 supply the first cooled mould 41. The first cooled mould 41 is subjected to docking at the docking station 320.

The robot 100 further rotates clockwise to register the head 104 at the mould supply unit 120 and the fingers 115 take out the sixth empty mould 46. Next, the robot 100 rotates counterclockwise to register the head 104 at the material charge unit 140, the fingers 115 supply the sixth empty mould 46 and take out the fifth charged mould 45. Material paste is charged in the sixth mould 46 at the material charge unit 140.

The robot 100 next rotates counterclockwise to register the head 104 at the cooling unit 180, the fingers 115 supply the fifth charged mould 45 and take out the second cooled mould 42. The third to fifth charged moulds 43-45 are cooled at the cooling unit 180.

The robot 100 rotates clockwise to register the head 104 at the docking unit 320, the fingers 115 supply the second cooled mould 42 and take out the first evacuated mould 41. The second cooled mould 42 is subjected to docking at the docking station 320.

The robot 100 rotates further clockwise to register the head at the material charge unit 140, the fingers 115 supply the first evacuated mould 41 and take out the sixth charged mould 46. Material paste is charged in the first evacuated mould 41 at the material unit 140.

The robot 100 next rotates counterclockwise to register the head 100 at the cooling unit 180, the fingers 115 supply the sixth charged mould 46 and take out the third cooled mould 43. The fourth to sixth charged moulds 44-46 are cooled at the cooling unit 180.

The robot 100 then rotated clockwise to register the head 104 at the docking unit 320, the fingers 115 supply the third cooled mould 43 and takes out the second evacuated mould 42. The third cooled mould 43 is subjected to docking at the docking unit 320.

(XIII) General Operation of the Second Robot 200

One example of the general operation performed by the second robot 200 will now be explained in reference to FIG. 3. Battles are indicated with two digit numbers, the first digit indicates that the object is a bottle 2 and the second digit indicates the order of sequence of the bottle. That is, the first bottle is indicated with a reference numeral "21" whereas the third bottle is indicated with a reference numeral "23".

The first robot 100 subsequently repeats the travel from the material charge to the cooling unit and from the cooling to the docking units so that six moulds 41-46 should circuate between these units.

First, the second robot 200 rotates to register its head 204 at the bottle supply unit 220 and the holding nozzles 218 take out the first group of bottles 21. The robot 200 next rotates clockwise to register the head 204 at the bottle draw-out unit 240 and the holding nozzles 218 supply the first group of bottles 21 to which drawing-out is applied.

The robot 200 rotates counterclockwise to register the head 204 again at the bottle supply unit 220 and the holding nozzles 218 take out the second group of bottles 22. Next, the robot 200 rotates clockwise to register the head 204 at the bottle draw-out unit 240, the holding nozzles 218 supply the second group of bottles 22 and the finger plates 213 take out the first group of bottles 22.

The robot 200 now rotates clockwise to register the head 204 at the docking unit 320 and the finger plates 213 supply the first group of bottles 21. Here, the bottles 21 are combined with, for example, the sticks 1 on the first cooled mould 41 supplied by the first robot 100. That is, docking is carried out.

The robot 200 further rotates clockwise to register the head 204 at the stick draw-in unit 260 and the finger plates 213 supply the first group of stick-bottle combination to which drawing-in is applied.

The robot 200 meanwhile rotates counterclockwise to register the head 204 at the bottle supply unit 220 and the holding nozzles 218 take out the third group of bottles 23. Next, the robot 200 rotates clockwise to register the head 204 at the bottle draw-out unit 240, the holding nozzles 218 supply the third group of bottles 23 and the finger plates 213 take out the second group of bottles 23. Drawing-out is here applied to the third group of bottles 23.

The robot 200 further rotates clockwise to register the head 204 at the docking unit 320 and the finger plates 213 supply the second group of bottles 22 which are here combined with sticks 1 on, for example, the second cooled mould 42 supplied by the first robot 100 for docking purposes.

The robot 200 rotates further clockwise to register the head 204 at the stick draw-in unit 260, the finger plates 213 supply the second group of stick-bottle combinations and the holding nozzles 218 take out the first group of stick-bottle combinations. Drawing-in is applied to the second group of stick-bottle combinations.

The robot 200 now rotates counterclockwise to register the head at the capping unit 280 and the holding nozzles supply the first group of stick-bottle combinations to which capping is applied.

The second robot 200 subsequently repeats the travel from the bottle supply unit 220 to the capping unit 280 via the bottle draw-out 240, the docking unit 320 and the stick draw-in unit 260. The bottles 2 travel in a same way while receiving different operations at different units.

(XIV) Counteractions taken by the Robots 100 and 200 at Malfunction in Docking Operation Malfunction is most liable to happen at the docking unit 320 whereat bottles are combined with sticks. In order to meet this trouble, it is preferably employed in the present invention to arrange a proper detector at the docking unit in order to sense the state of docking. At any malfunction, the detector generates an interruption signal which urges the robots 100 and 200 to the expedient counteractions.

On generation of an interrupt signal, robot 200 does not start the operation to move the stick-bottle combinations to the stick draw-in unit 260. The first robot 100 discontinues its normal operations and rotates to register its head 104 at the docking unit 320 whereat the fingers 115 take out a defective mould. Next, the first robot 100 rotates clockwise to register the head 104 at the defective mould unit 160 and the fingers 115 supply the defective mould. Thereafter the first robot 100 takes out a new emply mould 4 from the mould supply unit 120 and supplies same to the material charge unit 140.

(XV) Variations

In the case of the material charge unit 140 shown in FIG. 7, only one set of material paste nozzle 149 is used and material paste is sequentially charged in the stick holes 7 in a mould 4 which is move by the material charger 147 by intermittent movement of the operation table 143. Alternatively, a plurality of material paste nozzles may be arranged at the material charge unit 140 in order to charge the material paste in all of the stick holes in the mould at once.

In the case of the docking unit 320 shown in FIG. 9, two pairs of opener pins 328 are used for opening a mould 4. Other types of opener mechanism may be used to this end. For example, a combination of an electric magnet with a solenoid may be used.

MERITS OF THE INVENTION (I) Assemblage of lipsticks is carried out in a fully automatic fashion by well coordinated operations of a pair of numerically controlled robots without any manual operation. Manual labor is greatly saved.

(II) There is no manual touch at all to the objects during the process. This is very preferable from sanitary point of view in particular when the objects are lipsticks which come into direct contact with users' lips.

(III) The fully automatic operation by means of the robots and the associated operation units enables prosecution of the assemblage in a fully cleansed room which is well suited for handling of objects such as lipsticks.

(IV) Since the objects are held upside down all through the process, there is very little accumulation of dusts and other contaminations on the objects during processing.

(V) No capsules are used for holding and transportation of the objects. In the case of a lipstick, only the bottle and the mould are subjected to mechanical handling. Cost on parts is greatly reduced.

(VI) By change in the mode of numerical control at the robots, process conditions can be set very subtlly and can be adjusted easily as required. The system as a consequence is well suited for small scale production with high lot number in which shift of lot is highly frequent.

(VI) No stagnation of semi-products all through the process. The operation of the system is highly streamlined.

(VII) No idle time in operation of the robots. Supply of a new object to an operation unit is always accompanied with concurrent delivery of an operated object from the operation unit. There is no waste in operation of the robot. As a consequence, operation efficiency of the system is very high.

(VIII) Sticks are held in a mould during holding and transportation without any direct contact with the operation terminal of the first robot. Change in type of the objects requires corresponding change in shape of the stick holes only but not the configuration of the mould. Thus, change in shape of sticks requires no corresponding change in design of the first robot.

(IX) No flaming is necessary. Although a mould has a splittable section and crests may be developed on a stick during charging, the tail of the stick bearing such crests is inserted into the stick holder of a bottle at docking. Further, the sticks are accommodated within a mould before arrival at the docking station and blocked against any contact with other things after the docking station. There are niether finger prints nor wounds on the outer surface of the sticks. As a consequence, no flaming is needed to smooth the exterior of the stick.

I claim:

1. Fully automatic method for assembling stick-type cosmetics using first and second robots comprising the steps of
   placing a mould in position at first operational station with its stick holes open upwards,
   taking out said mould from said first operational station by operation of said first robot for transfer to a second operational station,
   charging material paste in said stick holes of said mould at second operation station,
   taking out a charged mould from said second operational station by operation of said first robot for transfer to a third operational station whereat said charged mould is cooled,
   taking out a cooled mould from said third operational station by operation of said first robot for transfer to a fourth operational station,
   exposing tails of sticks out of the top face of said mould at said fourth operational station,
   placing, concurrently with the above-described operations of the first robot, a group of bottles upside down in position at a fifth operational station, the number of said bottles in said group being equal to that of said stick holes in said mould,
   taking out said group of bottles from said fifth operational station by operation of said second robot for transfer to a sixth operational station while keeping upside down position of said bottles, causing relative rotation between the main case and the rotary body of each said bottle for projection of the stick holder at said sixth operational station, taking out said group bottles upside down from said sixth operational station by operation of said second robot for transfer to said fourth operational station, combining said bottles with said tails of said sticks by operation of said second robot at said fourth operational station, separating stick-bottle combinations from said mould by operation of said second robot at said fourth operational station, taking out said mould separated from said stick-bottle combinations from said fourth operational station by operation of said first robot for transfer to said second operational station, taking out a charged mould from said second operational station by said first robot for transfer to said third operational station, taking out, concurrently with the above-described operations of the first robot, said stick-bottle combinations from said fourth operational station by operation of said second robot for transfer to a seventh operational station, causing relative rotation between the main case and the rotary body of said bottle in each said stick-bottle combination for withdrawl of the stick at said seventh operational station, taking out said stick-bottle combinations from said seventh operational station by operation of said second robot for transfer to an eighth operational station, and combining said stick-bottle combinations with caps placed upside down in positions at said eighth operational station by operation of said second robot.

2. Fully automatic method as claimed in claim 1 further comprising the steps of generating an interruption signal on automatic detection of malfunction at said fourth operational station, taking out a defective mould from said fourth operational station by operation of said first robot activated by said interruption signal for transfer to a ninth operational station, and taking out a new mould from said first operational station by operation of said first robot for transfer to said second operational station.

3. Fully automatic apparatus for assembling stick-type cosmetics comprising a first robot provided with a main body rotatable in a horizontal direction, an extensible arm projecting forwards from said main body, a head secured to the tip of said arm, and at least one pair of fingers which are vertically movably coupled to said head and adapted for clamping a mould for shaping sticks, a mould supply unit arranged within the operational ambit of said first robot, a material charge unit arranged within said operational ambit of said first robot and provided with at least one material paste nozzle, a cooling unit arranged within said operational ambit of said first robot, a second robot provided with a main body rotatable in a horizontal direction, an extensible arm projecting forwards from said main body, a head main body coupled to the tip of said arm in a horizontally rotatable arrangement, a pair of finger plates which are vertically movablly coupled to said head main body and adapted for clamping prescribed number of bottles, and holding nozzles vertically movably coupled to said head main body in communication with a pneumatic suction source and adapted for holding same number of bottles, a bottle supply unit arranged within the operational ambit of said second robot, a bottle draw-out unit arranged within said operational ambit of said second robot and provided with means for causing relative rotation between the main case and the rotary body of each said bottle, a stick draw-in unit arranged within said operational ambit of said second robot and provided with means for causing relative rotation between the main case and the rotary body of each said bottle, and a docking unit arranged within said operational ambits of said first and second robots and provided with means for exposing tails of sticks out of said mould.

4. Fully automatic apparatus as claimed in claim 3 in which said means for causing relative rotation includes a plurality of fixed holding teeth arranged side by side in a horizontal direction, same number of mobile holding teeth arranged in parallel to said fixed teeth and driven for movement towards said fixed holding teeth in order to clamp main cases of same number of bottles, and same number of vertical rotors arranged side by side for elastic pressure contact with tail ends of rotary bodies of said bottles clamped by said fixed and mobile holding teeth.

5. Fully automatic apparatus as claimed in claim 3 in which said exposing means includes a horizontal operation table on which said mould is placed, two pairs of opener gears each having an opener pin projecting towards an end of said mould placed on said operation table, and means for advancing said opener gears towards ends of said mould and causing engagement of said opener pins with pin holes formed in said ends of said mould.

6. Fully automatic apparatus as claimed in claim 3 further comprising a defective mould unit arranged within said operational ambit of said first robot.

* * * * *